United States Patent Office 3,795,749
Patented Mar. 5, 1974

3,795,749
PACKAGING LETTUCE IN CARBON DIOXIDE
PERMEABLE FILM
Alfred S. Cummin, Westfield, Henryk Daun, New Brunswick, and Seymour G. Gilbert and Yair Henig, Piscataway, N.J., assignors to Borden, Inc., Columbus, Ohio
No Drawing. Filed Mar. 31, 1972, Ser. No. 240,238
Int. Cl. B65b 25/04
U.S. Cl. 426—316                                           5 Claims

ABSTRACT OF THE DISCLOSURE

The storage temperature of lettuce can be increased and the period of time the lettuce remains fresh can be extended if the lettuce is packaged in a film which is at least three times as permeable to carbon dioxide as to oxygen, and has an oxygen permeability of at least 2,000, and a carbon dioxide permeability of at least 10,000.

BACKGROUND OF THE INVENTION

This invention is directed to packaging lettuce in a film having a permeability to oxygen which matches the requirements of the lettuce for oxygen and a permeability to carbon dioxide which matches the requirements of the lettuce to expel carbon dioxide.

It is known that the storage life of lettuce can be prolonged by controlling the atmosphere surrounding the lettuce. Thus, the storage life of lettuce has been prolonged by packaging the lettuce in materials such as polystyrene or polyethylene at a reduced temperature. The prior art relating to the packaging of lettuce in polyethylene is exemplified by U.S. Pat. 3,450,543 of Badran, et. al.

Some of the disadvantages of the prior art relating to the packaging of lettuce in polyethylene are: (1) there is a tendency for the lettuce to be subject to attack by anaerobic bacteria which produces alcohols, aldehydes and acids; (2) the lettuce requires critically controlled refrigeration; (3) there is a harmful carbon dioxide buildup inside the package. Attempts to overcome the carbon dioxide buildup by including quick lime, charcoal, or potassium permanganate to the package are troublesome, expensive and creates a health hazard. Prior art attempts to overcome have included perforation of the wrapping film. This has resulted in dehydration of the lettuce and cross-infection by bacteria and fungus. Lettuce is generally shipped from the fields to central distribution points. Somewhere between the central distribution points and the display shelves of the stores, the lettuce is usually packaged in film for sanitation purposes. In the meantime, the intermingling of the unwrapped heads of lettuce has spread fungal and bacterial infection among the lettuce. During shipment, the heavy outer leaves have been left on the lettuce to act as hosts for the various infections which have spread. The outer leaves are removed and discarded after they have been shipped from the field where the lettuce was grown to the displaying store or the kitchen of the housewife.

Some of the problems relating to the packaging of lettuce in polystyrene are: (1) the film has a low tensile strength which results in package rupture; (2) the film is not as flexible and does not cling to lettuce as is desired in lettuce packaging to eliminate air spaces.

SUMMARY OF THE INVENTION

Lettuce is packaged as soon after it is picked as is practicable in a polyvinyl chloride film having a high tensile strength, good cling properties and a high ratio of permeability of carbon dioxide to permeability of oxygen. Prior to packaging, it is also preferred that the dark outer leaves be removed and discarded. They are a source of infection and significantly increases shipping costs. Their removal also allows the housewife to inspect visually the fresh inner leaves of lettuce in the protective package. Another embodiment is that the lettuce be washed in a bactericide or fungicide preferably after the outer leaves are removed.

DESCRIPTION OF THE PREFERRED EMBODIMENT

Lettuce can be packaged in films of varying permeabilities to prolong its storage time and allow it to be stored at highter temperatures. This is accomplished by wrapping the lettuce in an imperforate gas permeable polyvinyl chloride film having a ratio of carbon dioxide permeability to oxygen permeability of at least 3.0 and an oxygen permeability of at least 2,000 and a carbon dioxide permeability of at least 10,000. As a practical matter, the oxygen permeability of polyvinyl chloride film does not exceed 4,000 and the carbon dioxide permeability does not exceed 25,000.

The film is sealed around the lettuce so as to prevent any gas from entering or leaving the package by any means other than permeating the film. The lettuce is then stored in the package. The package prolongs the storage time of the lettuce so packaged and allows the lettuce to be stored at a higher temperature than unpackaged lettuce. It also protects the lettuce against temperature fluctuation during shipment. This allows more time for shipment and also more time for display of the lettuce in the market.

As a practical matter, it is preferred that the films have a permeability ratio of carbon dioxide to oxygen of about 4 to 10. Less than 4 is undesirable due to carbon dioxide buildup and greater than 10 is difficult to achieve due to film permeability characteristics.

The preferred oxygen permeability is about 2,250 to 4,000. The preferred carbon dioxide permeability is about 12,500 to 25,000.

Lettuce is especially susceptible to damage due to the presence of carbon dioxide. The present invention is directed to packaging lettuce in a film which is highly permeable to carbon dioxide so as to allow it to freely escape from the package.

Due to the enhanced permeability characteristics of plasticized polyvinyl chloride film, this film is the preferred packaging film. The presence of plasticizer enhances the permeability of the film and the permeability ratio of the film. The plasticized film has necessary tensile strength, transparency, water transmission properties and can contain other materials such as antifogging agents.

The preferred film has a thickness of about 0.75 mil to about 1.35 mils. The moisture permeability of the preferred film is between about 6 to about 25 grams per 24 hours per 100 square inches per mil at 100° F. This permeability allows sufficient moisture to escape but retains enough moisture in the package to prevent the lettuce from drying out.

The preferred method of packaging lettuce involves wrapping each head of lettuce individually with a plastic film having the above described permeability characteristics. The film is then heat sealed to prevent the passage of air into the package except by passage through the film. By this method, the lettuce so packaged is protected from fungal or other infections during shipment and the time the lettuce remains fresh is prolonged. The lettuce preferably is shipped in the same package to the store where it is sold to the buying housewife. The package provides, in addition to its prolonging the ripening time and protecting against infection, an attractive article to be placed on the sales shelf. The film is preferably transparent, and the housewife can inspect the contents visually. The film also allows the lettuce to remain in its bright fresh condition while on the shelf of the store for a prolonged period of time. The lettuce can be treated with an antimicrobial such as a chlorine solution wash prior to packaging.

The films which have been successfully employed in the practice of the present invention are films made from plasticized polyvinyl chloride. The term polyvinyl chloride includes copolymers of polyvinyl chloride. For example, the polyvinyl chloride can also be a copolymer of polyvinyl chloride and polyvinyl acetate or mixtures of the homopolymers of the two. Other copolymers of polyvinyl chloride that can be used are the $C_1$ to $C_8$ alkyl esters of alpha-unsaturated aliphatic acids having 3 to 5 carbon atoms to the molecule of said acid. Examples of the alkyl esters include methyl, ethyl, and octylacrylate and methacrylate. The copolymers and mixtures of the homopolymers provides satisfactory films for packaging lettuce.

The plasticizer is present in the proportion of between about 20 to 60 parts by weight per 100 parts of vinyl polymer resin. The preferable plasticizers which can be used in the formulation include di(2-ethylhexyl) adipate and di(2-ethylhexyl) phthalate. Other plasticizers which can be used include acetyl tributylcitrate, epoxidized soybean oil, butyl phthalyl butyl glycolate, diisobutyl adipate, diphenyl (2-ethylhexyl) phosphate, butyl benzyl phthalate, and the like and mixtures thereof. The total plasticizer concentration in the vinyl film should generally be between about 20–60 parts by weight of plasticizer for 100 parts by weight of vinyl film and preferably at least 30 parts. The higher plasticizer levels result in higher permeabilities and are preferred.

Other additives to the film composition may include usual stabilizers for polyvinyl chloride film such as, for example, triphenyl phosphate, nonylphenol, barium, cadmium, calcium, and zinc salts of lauric and other fatty acids and mixtures thereof.

An antifogging agent may also be present. The antifogging and antitackifying agent is a partial ester of water soluble polyols and aliphatic monocarboxylic acids (referred to as partial ester 1) and polyalkoxylated derivatives of a partial ester of water soluble polyols and aliphatic monocarboxylic acids (referred to as partial ester 2).

Partial ester 1 is a partial (such as mon-ester) of a water soluble $C_{2-6}$ polyol which polyol contains at least two alcohol groups. A minimum of one of such alcohol groups are not reacted with acid to form the ester and at least one of such alcohol groups are reacted with acid to form the ester. The polyol component of this partial ester may be glycerol; ethylene, propylene or other $C_{2-4}$ glycols, trimethylol propane, sorbitol, and the like. The acid component may be any $C_{12-18}$ aliphatic monocarboxylic acid, examples of which are lauric, oleic, stearic, palmitic and the like acids.

Partial ester 2 is a polyalkoxylated derivative of a partial ester of a water soluble $C_{2-6}$ polyol which polyol contains at least two alcohol groups. A minimum of one of such alcohol groups are not reacted with acid to form the ester, and at least one of such alcohol groups are reacted with acid to form the ester. The polyol component of this partial ester may be glycerol; ethylene; propylene or other $C_{2-4}$ glycols; trimethylol propane; sorbitol; sorbitan and the like. The acid component may be any $C_{12-18}$ aliphatic monocarboxylic acid, examples of which are lauric, palmitic, oleic, stearic and like acids. The alkoxylated groups of said partial ester 2 each have between about 2 to 3 carbon atoms per repeating alkoxyl unit. The number of alkoxylated groups may be between about 3–30 per molecule of the alkoxylated partial ester. Illustrated examples are polyoxyethylene sorbitan monooleate, polyoxypropylene propylene glycol monooleate, polyoxybutylene trimethylol propane monooleate and the corresponding stearates, laurates, palmitates, etc., said partial esters having 5–25 alkoxylated groups to the molecule are usually preferred. The best results are generally obtained with polyoxyethylene sorbitan monooleate having about 20 oxyethylene groups to the molecule.

In order to impart antifogging properties to a vinyl film, both partial esters must be present in the composition. From the point of view of strictly antifogging properties in the film, we have found that 2 parts (about) by weight of each ester for 100 parts of polymeric vinyl resin will result in good nonfogging properties in a film or sheet made from said resin. However, when relatively high proportions of common plasticizers are included in the film formulation in order to obtain greater gas diffusion through the film, we prefer to have excess of 2 parts and about at least 3 parts of partial ester 1 added to the film formulation in order to maintain the high level of antiblocking properties of the film.

There may also be included food colors to establish the color desired.

Generally, the polymeric vinyl resin, plasticizer, etc., are heated and/or subjected to high shear and thus blended. When heat is used in blending, the temperature is such that it is sufficient to provide adequate penetration of the plasticizer and said agent into the vinyl resin. The solution is then extruded, drawn, blown or in any other convenient manner made into a film or sheet. The thickness of the film or sheet can be varied as desired, however, it has been found that a useful thickness for packaging lettuce is between about .1 mil and 2 mils, preferably about 0.75 mil to 1.35 mils. Thickness greater than 2 mils may require additional plasticizer to attain the desired gas permeability rates.

The permeability data used in the following examples was obtained using a method developed by Professor Seymour Gilbert at Rutgers University. The procedure is set forth in an article written by him in the January 1969 issue of Package Engineering at pages 66 through 99. The oxygen and carbon dioxide permeabilities are expressed in cubic centimeters per 100 square inches per 24 hours per atmosphere. The water vapor transmission rate is given in units of grams per 100 square inches per 24 hours at 100° F. (90% relative humidity). The gas permeability data was obtained at 24° C. In the following example, as in the specification and claims generally, all parts and percentages are by weight unless expressed otherwise.

EXAMPLE

A group of 10 heads of lettuce were picked and the outer leaves were removed. The heads were packaged using a plasticized polyvinyl chloride film. The film had a thickness of 0.75 mil, a water transmission rate of 20, an oxygen permeability of 2,250 and a carbon dioxide permeability of 12,500 and a ratio of carbon dioxide permeability to oxygen permeability of 6.3. The film was heat sealed to exclude air other than that which diffuses through the film. The packages were shipped to their ultimate destination and then stored at 73° F. The total shipping and storage period being 17 days.

At the expiration of the storage, some of the packages were opened and the heads of lettuce were fresh. No mold or growth was observed. The results were reproduced using films having oxygen permeabilities of from 2,000 to 2,500 and carbon dioxide permeabilities of from 10,000 to 15,000. Unpackaged heads of lettuce picked at the same time were completely spoiled after 17 days storage.

The above lettuce packaging procedure was repeated except that the series of films which were used were films having thicknesses of 0.75 mil, significantly different carbon dioxide permeabilities of less than 10,000, significantly different oxygen permeabilities of less than 2,000, and significantly different ratios of carbon dioxide permeabilities to oxygen permeabilities of all ratios being at least 3.

At the end of 17 days, all the lettuce had developed an unpleasant odor. Some had spoiled completely. The further removed the films were from the preferred ranges, the greater the degree of spoilage.

Having thus described our invention, and what we desire to secure by Letters Patent of the United States is:

1. A method of packaging lettuce as soon after harvest as practicable consisting essentially of:
   (a) removing the outer leaves from the lettuce;
   (b) completely wrapping the lettuce in an imperforate gas permeable polyvinyl chloride film having, an oxygen permeability of 2,000 to 4,000 cc. per 100 square inches per 24 hours per atmosphere, and a carbon dioxide permeability of 4 to 10 times as great as the permeability to oxygen with the further provision that the permeability to carbon dioxide be not less than about 10,000 nor more than about 25,000 cc. per 100 square inches per 24 hours per atmosphere;
   (c) sealing the film around the lettuce so wrapped;
   (d) shipping the wrapped lettuce.

2. The method of claim 1, wherein the film has a thickness of 0.75 mil to about 1.35 mils.

3. The method of claim 1, wherein the moisture permeability is between about 6 to about 25 grams per 24 hours at 100 square inches per mil at 100° F.

4. The method of claim 1, wherein the lettuce is treated with an antimicrobial prior to packaging.

5. The method of claim 4, wherein the antimicrobial is chlorine.

References Cited

UNITED STATES PATENTS

| | | | |
|---|---|---|---|
| 3,630,759 | 12/1971 | Rumberger | 99—171 LP |
| 3,289,386 | 12/1966 | Farmer | 53—28 |
| 3,591,515 | 7/1971 | Lowely | 99—154 X |
| 3,639,318 | 2/1972 | Tijunelis et al. | 99—171 (LP) X |
| 3,423,212 | 1/1969 | Purcell et al. | 99—171 LP |
| 2,571,340 | 10/1951 | Carson | 99—171 LP |
| 3,450,543 | 6/1969 | Badran et al. | 99—171 R |
| 2,539,470 | 1/1951 | Pryor | 99—154 |

OTHER REFERENCES

U.S. Dept. of Agriculture 5/60 "Lettuce," 99/154.

Modern Packag. Encyclopedia, McGraw-Hill, vol. 41, No. 7A, 1968, pp. 165, 185; vol. 44, No. 7A, 1971, p. 138.

FRANK W. LUTTER, Primary Examiner

S. L. WEINSTEIN, Assistant Examiner

U.S. Cl. X.R.

426—326, 415